United States Patent [19]

Owens

[11] 3,764,011

[45] Oct. 9, 1973

[54] SEWAGE TREATMENT APPARATUS

[76] Inventor: Dewey E. Owens, P.O. Box 2443, Lafayette, La. 70501

[22] Filed: Dec. 16, 1971

[21] Appl. No.: 208,834

[52] U.S. Cl.................. 210/195, 210/197, 210/199, 210/202, 210/237, 210/260
[51] Int. Cl............................................. C02c 1/08
[58] Field of Search ...................... 210/5, 7, 14, 15, 210/18, 60, 62, 63, 64, 197, 202, 205, 206, 221, 241, 259, 260, 319, 320, 242, 425, 435, 525, 535, 195

[56] References Cited
UNITED STATES PATENTS

| 3,206,032 | 9/1965 | Nottingham et al. | 210/197 X |
| 3,677,409 | 7/1972 | Ferm et al. | 210/221 X |
| 3,419,146 | 12/1968 | Koulovatos | 210/202 X |
| 3,223,243 | 12/1965 | Muller | 210/242 |
| 3,630,365 | 12/1971 | Woodbridge et al. | 210/259 X |

Primary Examiner—Samih N. Zaharna
Assistant Examiner—Robert H. Spitzer
Attorney—Emory L. Groff et al.

[57] ABSTRACT

A portable self-contained sewage treatment plant particularly designed to meet the needs of small subdivisions and the like contains within a single tank body an aeration chamber, a settlement chamber and a chlorination chamber. The plant features an aeration system which also serves to power jets for the return of heavy and light solids from the settlement chamber into the aeration chamber. A floating skimmer in the settlement chamber removes light solids from the surface of the liquid for delivery to one return jet. Liquid from the settlement chamber flows into the chlorination chamber and clear effluent is discharged from the latter.

6 Claims, 6 Drawing Figures

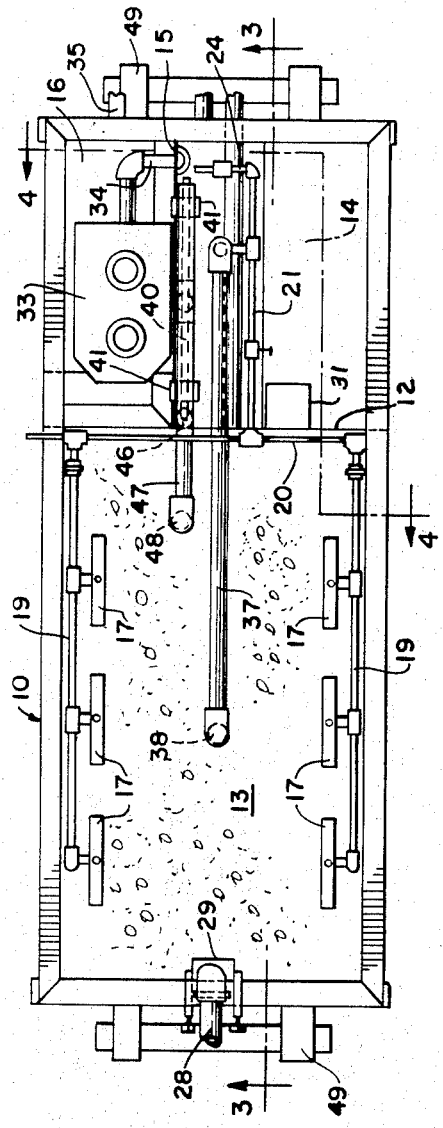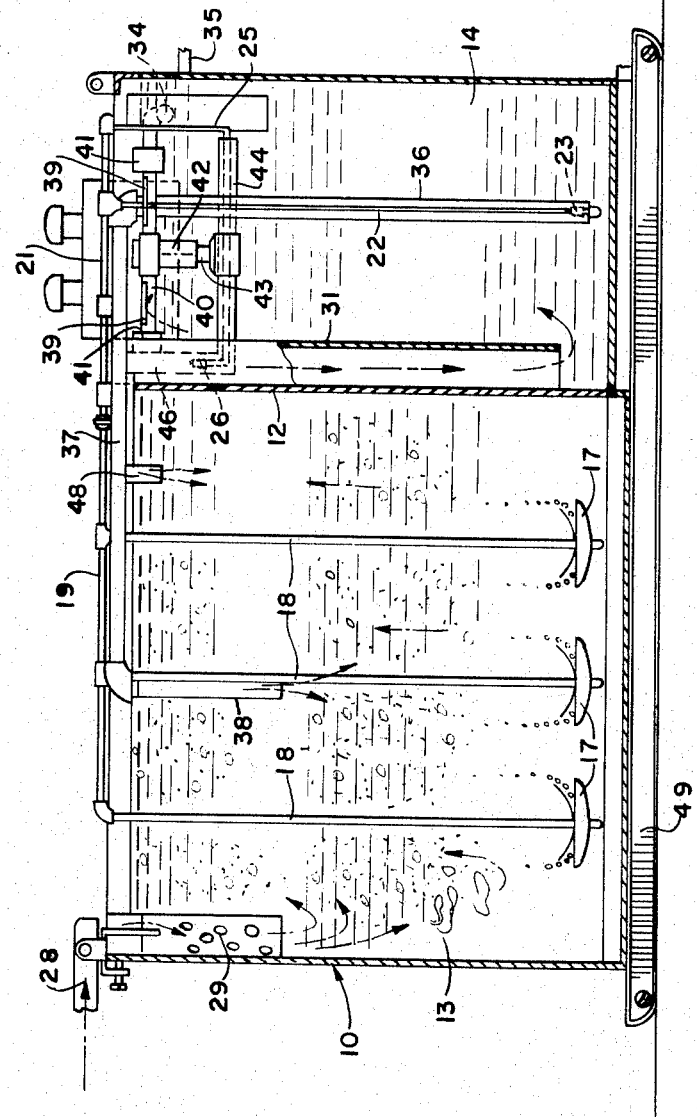
FIG. 2.
FIG. 3.

SEWAGE TREATMENT APPARATUS

The invention has arisen because of a need for a compact limited capacity portable sewage treatment apparatus or plant to meet the needs of offshore oil-producing facilities and small sub-divisions. The plant embodying the invention has a capacity range to satisfy the needs of one-half dozen to about one hundred twenty people and within this range is constructed in about six different sizes. The plant is unitary and self-contained and is equipped with skids and lifting eyes for ready transportability. It utilizes continuous gravity flow and overflow upon receiving raw sewage from a given source and needs only to be connected with any convenient source of compressed air. The extreme compactness and great efficiency of the plant is based to a great extent on the utilization of a jet return for solids from the settlement chamber or tank back into the aeration tank so that the proper detention time for solids in the aeration tank is assured until all solids are eliminated by bacteria. The treatment plant is therefore particularly suited to the needs of certain installations which cannot be satisfied economically by equipment known to the prior art. Therefore, the invention can be considered to be a specialized apparatus in the above sense, although it is useful in a number of different situations where relatively small groups of workmen or inhabitants are located. The plant would be highly useful, for example, in certain mobile home and trailer camp facilities.

Other features and advantages of the invention will become apparent during the course of the following description.

BRIEF DESCRIPTION OF DRAWING FIGURES

FIG. 2 is a plan view of the apparatus or plant.

FIG. 3 is a vertical section taken on line 3—3 of FIG. 2.

DETAILED DESCRIPTION

Figure 1:
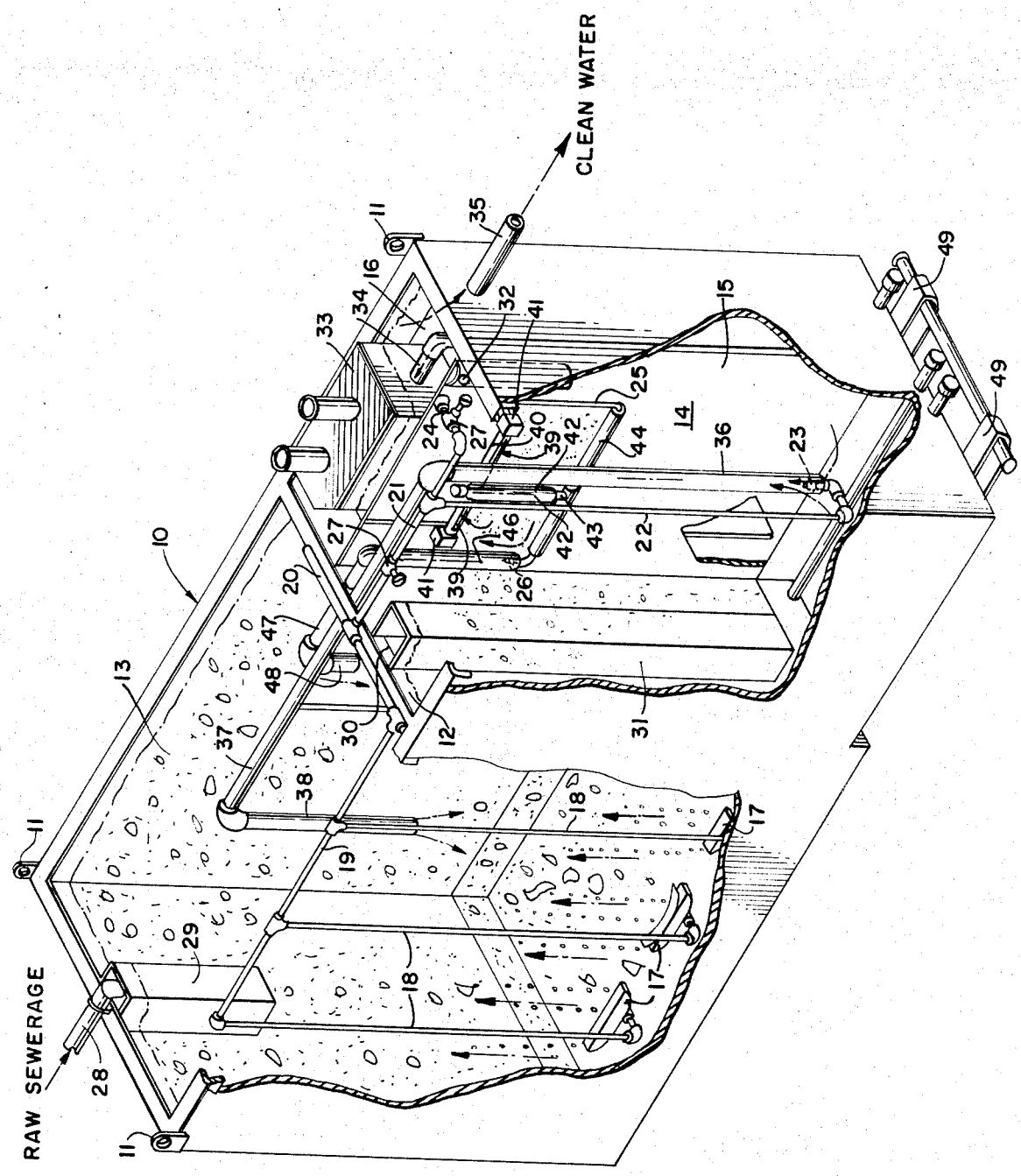
FIG. 1 is a perspective view, partly in section and partly broken away, showing a sewage treatment plant embodying the invention.
Figure 4:
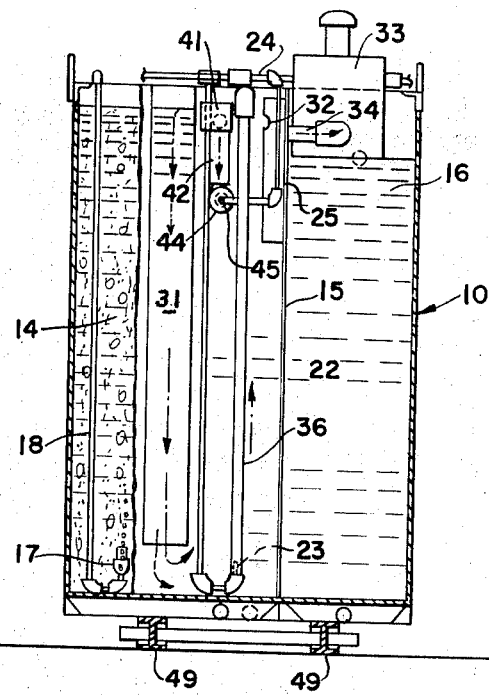
FIG. 4 is a vertical section taken on line 4—4 of FIG. 2.

Referring to the drawings in detail, wherein like numerals designate like parts throughout the same, the numeral 10 designates a somewhat elongated unitary rectangular tank body of rigid construction and preferably equipped at its four upper corners with lifting eyes 11 by means of which the entire apparatus or plant may be lifted and positioned at a desired site by a crane or the like. The tank body 10 contains a transverse vertical partition wall 12 spaced relatively near one end wall of the tank body and defining with the side walls of the tank body an open top aeration chamber 13. A settlement chamber 14 is formed in the tank body 10 on the other side of the partition wall 12, and a longitudinal divider wall 15 separates the settlement tank 14 or chamber from a chlorination chamber 16 in the adjacent end portion of the tank body 10.

Mounted near the bottom of the aeration chamber 13 along the opposite sides thereof are submerged air diffuser heads 17 which serve to assist in the flotation of solid matter to the liquid surface in the chamber 13 and also promote the growth and propagation of bacteria therein. The diffuser heads 17 are supplied with compressed air through vertical branch lines 18 connected at their tops with horizontal headers 19 which extend along the sides of the tank body near the top thereof. Corresponding ends of the headers 19 are connected in a branch line or pipe 20 which may lead to any convenient compressed air source. Another line 21 connected in the line 20 extends over the settlement tank 14 and descends at 22 to deliver air to an upwardly directed air jet nozzle 23 whose function will be described. A short lateral air branch line 24 at one end of the line 21 delivers air to a descending line 25 supplying air to another air jet nozzle 26, whose purpose or function will be fully described. Manual valves 27 are provided in the lines 21 and 24 for convenience so that the air jets at the nozzles 23 and 26 can be disabled if this should be desired.

Raw sewage is delivered to the inlet end of aeration chamber 13 by a suitable delivery pipe 28 having a downwardly directed outlet, the flowing sewage passing through a stainless steel strainer 29 mounted on the adjacent tank body end wall. The liquid eventually filling the chamber 13 will overflow an edge 30 and will be fed by gravity down through an enclosure 31 attached to the partition wall 12 and extending near the bottom of the settlement tank 14. When this compartment is filled by the continuous flow of the system, the liquid will eventually enter an opening 32 leading to the chlorination chamber or tank 16 in which a chlorinator apparatus 33 is mounted. From the opening 32, the liquid flows through a pipe 34 into the chlorinator apparatus 33 and then, after flowing through the chlorinator, the completely clear water passes from the plant through a discharge pipe 35 communicating with the chamber 16.

After flowing by gravity from the aeration chamber 13 into the settlement chamber 14, the heavier solids near the bottom of the chamber 14 are entrained by the upwardly directed air jet nozzle 23 and caused to flow upwardly through a vertical pipe 36 whose lower end is open surrounding the jet nozzle 23. The liquid and entrained solids passing up through the pipe 36 enters a horizontal return pipe 37 near the top of the tank body which extends over the center of the aeration chamber 13 and delivers the solids back into the same through a depending outlet 38. This jet return system assures a proper length of detention time for the solids in the chamber 13, which is customarily about 16 hours.

Figure 5:
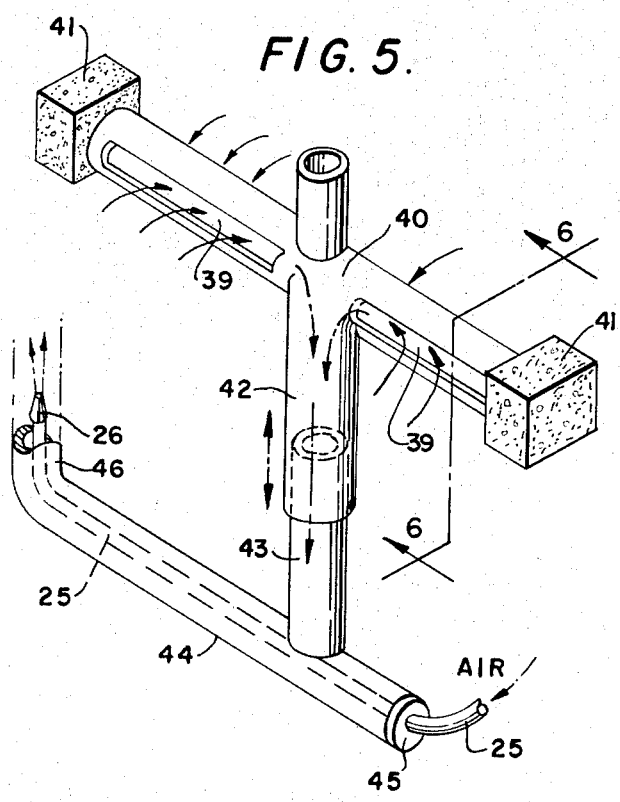
FIG. 5 is a perspective view of a floating skimmer employed in the apparatus.
Figure 6:
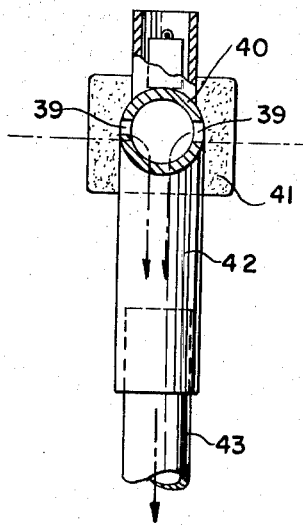
FIG. 6 is a vertical section taken on line 6—6 of FIG. 5.

Simultaneously with the above action, the lighter solids which float on the liquid in the chamber 14 will enter horizontal slots 39 on opposite sides of a skimmer head 40 which is floatingly supported on the liquid in the chamber 14 by end floats 41. The skimmer head 40 is long enough to span a major portion of the width of settlement chamber 14 so that all lightweight solids will be skimmed off. After entering the skimmer head 40, such solids will pass downwardly through a short outlet pipe 42 which telescopes slidably over an upstanding sleeve or pipe 43, fixedly secured at its bottom to a horizontal pipe 44 having an end closure wall 45 through which the compressed air line 25 is connected, FIG. 5. The air line extends axially through the fixed pipe 44 as indicated at 25' and leads to the aforementioned upwardly directed air jet nozzle 26 within the lower end of a vertical pipe extension 46, the extension 46 forming a continuation of the horizontal pipe 44. The rising pipe extension 46 leads at its top to a horizontal return pipe 47 extending over the top of the aeration chamber 13 to return the light solids and liquid thereto through a depending outlet 48. The air jet nozzle 26 not only causes the entrained light solids to flow upwardly through the return system but creates a slight suction in the skimmer head 40 to draw liquid and solids through the slots 39 effectively. The floating skimmer head 40 can rise and fall freely to adjust with the liquid level in the chamber 14 because of the telescopic engagement of the pipes 42 and 43.

It will be understood in connection with the overall operation of the plant that a continuous flow through cycle prevails with gravity feed and overflow from one chamber into the next. Raw sewage is continuously entering the chamber 13 from pipe 28 and clear water is continually discharging from the pipe 35 with residual bacteria cultivated in the chamber 13 destroyed by the action of the chlorinator 33. During this continuous flow cycle, aeration of the liquid in the chamber 13 is continually taking place by the action of the air diffuser heads 17 and this breaks up solids and aids in their flotation while also propagating bacteria growth, as stated. Simultaneously, the dual jet return of solids to the chamber 13 is taking place and these solids are recycled through the aeration chamber until they are substantially eliminated by bacteria. Fine inorganic impurities remaining in the water, such as silicon particles, will settle out in the chamber 14. The floating skimmer head 40 effectively removes the lighter solids from the top of the liquid in the settlement chamber so that they may be returned to the aeration chamber by the means including the jet nozzle 26, the heavier solids returning to the chamber 13 from the bottom portion of chamber 14 by the operation of the means including air jet nozzle 23.

For further convenience in moving the compact treatment plant, the entire tank body 10 may be mounted on skids 49 but this is an optional feature and may be omitted in some cases.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A sewage treatment apparatus comprising a tank body having separated aeration, settlement and chemical treatment chambers and overflow passage means through which liquid may flow serially from one chamber to the next, aeration means in the aeration chamber, a floating skimmer in the settlement chamber and skimming lightweight solids from the liquid therein, return conduit means for said lightweight solids connected with the floating skimmer and leading to the aeration chamber, return conduit means for heavier solids leading from the bottom portion of the settlement chamber to the aeration chamber, said floating skimmer comprising an elongated substantially horizontal tube body having longitudinal slots in its opposite sides, flotation elements secured to the tube body, a depending outlet sleeve for fluid on the tube body, a coacting upstanding sleeve having telescopic sliding engagement with the depending sleeve and being connected to said return conduit means for said lightweight solids, and fluid jet nozzle means in both said return conduit means and inducing fluid flow therein, said jet nozzle means connected with and powered by said aeration means.

2. The structure of claim 1, and said aeration means comprising air diffuser heads in the aeration chamber near the bottom thereof, and air supply conduits connected with said heads and adapted for connection with a source of air under pressure.

3. The structure of claim 2, and said return conduit means for said lightweight and heavier solids including a pair of riser pipes, and said jet nozzle means comprising an upwardly directed air jet nozzle in each riser pipe arranged coaxially therewith.

4. The structure of claim 1, and said chemical treatment chamber comprising a chlorination chamber receiving liquid by overflow from the settlement chamber and having a pure liquid outlet.

5. The structure of claim 1, and a skid base for said tank body.

6. The structure of claim 5, and lifting elements on the tank body near the corners thereof and near the top of the tank body.

* * * * *